(12) United States Patent
Hamatani et al.

(10) Patent No.: US 11,782,811 B2
(45) Date of Patent: Oct. 10, 2023

(54) INFORMATION PROCESSING APPARATUS

(71) Applicant: NTT DOCOMO, INC., Chiyoda-ku (JP)

(72) Inventors: Takashi Hamatani, Chiyoda-ku (JP); Keiichi Ochiai, Chiyoda-ku (JP); Naoki Yamamoto, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 269 days.

(21) Appl. No.: 17/438,114

(22) PCT Filed: Jan. 28, 2020

(86) PCT No.: PCT/JP2020/002990
§ 371 (c)(1),
(2) Date: Sep. 10, 2021

(87) PCT Pub. No.: WO2020/189028
PCT Pub. Date: Sep. 24, 2020

(65) Prior Publication Data
US 2022/0253367 A1    Aug. 11, 2022

(30) Foreign Application Priority Data

Mar. 20, 2019  (JP) ................. 2019-052624

(51) Int. Cl.
*G06F 11/34* (2006.01)
*G06F 11/32* (2006.01)
(52) U.S. Cl.
CPC ........ *G06F 11/3476* (2013.01); *G06F 11/321* (2013.01); *G06F 11/3438* (2013.01)

(58) Field of Classification Search
CPC . G06F 11/321; G06F 11/3438; G06F 11/3476
(Continued)

(56) References Cited

U.S. PATENT DOCUMENTS

2017/0123625 A1* 5/2017 Gao ................ G06F 3/0481

FOREIGN PATENT DOCUMENTS

| JP | 2006338233 A | * | 12/2006 |
| JP | 2013-205936 A |  | 10/2013 |
| JP | 2017027377 A | * | 2/2017 |

OTHER PUBLICATIONS

International Search Report dated Apr. 7, 2020 in PCT/JP2020/002990 filed on Jan. 28, 2020 (2 pages).

(Continued)

*Primary Examiner* — Chae M Ko
(74) *Attorney, Agent, or Firm* — Oblon, McClelland, Maier & Neustadt, L.L.P.

(57) ABSTRACT

An information generation apparatus includes a feature information generator that generates feature information on transition to a first screen based on a log including a transition timepoint and identification information, the transition timepoint being a timepoint when a foreground screen transitioned from a second screen to the first screen among a plurality of screens displayed by a plurality of program modules that differ from each other, and the identification information identifying from among the program modules a first program module for displaying the first screen, an index value generator that generates an index value indicative of a degree to which the first screen draws attention from a user based on the feature information, and a determiner that determines based on the index value whether to use the identification information that identifies the first program module in a process of estimating the state of the user.

11 Claims, 10 Drawing Sheets

(58) Field of Classification Search
USPC .......................................................... 714/45
See application file for complete search history.

(56) References Cited

OTHER PUBLICATIONS

International Search Report dated Apr. 7, 2020 in PCT/JP2020/002990 filed Jan. 28, 2020 (2 pages).

* cited by examiner

FIG. 2

| TIME | OPERATION TYPE | APPLICATION NAME | SCREEN NAME | LG |
|---|---|---|---|---|
| 18:46:43 | FOREGROUND | A | A-MAIN SCREEN | LG1_1 |
| 18:46:44 | BACKGROUND | A | A-MAIN SCREEN | LG1_2 |
| 18:46:44 | FOREGROUND | A | A-LOGIN SCREEN | LG1_3 |
| 18:46:46 | BACKGROUND | A | A-LOGIN SCREEN | LG1_4 |
| 18:46:46 | FOREGROUND | A | A-PORTAL MENU SCREEN | LG1_5 |
| 18:46:48 | BACKGROUND | A | A-PORTAL MENU SCREEN | LG1_6 |
| 18:46:48 | FOREGROUND | A | A-SETTING SCREEN | LG1_7 |
| 18:46:52 | BACKGROUND | A | A-SETTING SCREEN | LG1_8 |
| ... | ... | ... | ... | |
| 18:53:48 | FOREGROUND | B | B-MAIL START SCREEN | LG1_9 |
| 18:53:50 | BACKGROUND | B | B-MAIL START SCREEN | LG1_10 |
| 18:53:50 | FOREGROUND | B | B-MAIL LIST SCREEN | LG1_11 |
| 18:55:32 | BACKGROUND | B | B-MAIL LIST SCREEN | LG1_12 |

FIG. 4

| CLASSIFICATION | FEATURE VALUE | FEATURE VALUE → DEGREE OF ATTENTION | |
|---|---|---|---|
| ACTIVATION NUMBER | TOTAL NUMBER OF ACTIVATIONS | LARGER → HIGHER | 401_1 |
| | AVERAGE VALUE OF THE NUMBER OF ACTIVATIONS | LARGER → HIGHER | 401_2 |
| | VARIANCE VALUE OF THE NUMBER OF ACTIVATIONS | LARGER → HIGHER | 401_3 |
| | DIFFERENCE BETWEEN MAXIMUM VALUE AND MINIMUM VALUE OF THE NUMBER OF ACTIVATIONS | LARGER → HIGHER | 401_4 |
| ACTIVATION TIME | AVERAGE VALUE OF LENGTHS OF ACTIVATED PERIODS | LONGER → HIGHER | 402_1 |
| | VARIANCE VALUE OF LENGTHS OF ACTIVATED PERIODS | LARGER → HIGHER | 402_2 |
| | DIFFERENCE BETWEEN MAXIMUM VALUE AND MINIMUM VALUE IN LENGTHS OF ACTIVATED PERIOD | LARGER → HIGHER | 402_3 |
| ACTIVATION SCREEN | THE NUMBER OF TYPES OF SCREEN ACTIVATED PREVIOUSLY | LARGER → HIGHER | 403_1 |
| | THE NUMBER OF TYPES OF SCREEN ACTIVATED SUBSEQUENTLY | LARGER → HIGHER | 403_2 |
| DISPLAY APPARATUS | DISPLAY APPARATUS LIGHTED RATE | HIGHER → HIGHER | 404 |
| BATTERY REMAINING AMOUNT | AVERAGE VALUE OF REMAINING BATTERY AMOUNTS | SMALLER → HIGHER | 405_1 |
| | VARIANCE VALUE OF REMAINING BATTERY AMOUNTS | LARGER → HIGHER | 405_2 |
| BATTERY CONSUMPTION AMOUNT | AVERAGE VALUE OF BATTERY CONSUMPTION AMOUNTS | LARGER → HIGHER | 406_1 |
| | VARIANCE VALUE OF BATTERY CONSUMPTION AMOUNTS | LARGER → HIGHER | 406_2 |
| COMMUNICATION STATE | WI-FI CONNECTION RATE | LOWER → HIGHER | 407 |
| LOCATION | THE NUMBER OF TIMES INFORMATION PROCESSING APPARATUS IS LOCATED AT POI | LARGER → HIGHER | 408 |

FIG. 6

| LIGHTED PERIOD |
|---|
| 18:25:00~18:59:22 |
| 19:02:01~21:55:45 |

INFOL

FIG. 7

| TIME | REMAINING BATTERY AMOUNT |
|---|---|
| 18:00:00 | 80% |
| 18:30:00 | 70% |
| 19:00:00 | 55% |
| 19:30:00 | 50% |

INFOB1

FIG. 8

| UNIT PERIOD | BATTERY CONSUMPTION AMOUNT |
|---|---|
| 18:00:00~18:30:00 | 10% |
| 18:30:00~19:00:00 | 15% |
| 19:00:00~19:30:00 | 5% |

INFOB2

FIG. 9

| PERIOD DURING WHICH CONNECTION WAS ESTABLISHED |
|---|
| 18:26:10~18:58:22 |
| 19:02:10~19:05:45 |

INFOW

| TIME | LATITUDE AND LONGITUDE |
|---|---|
| 18:00:00 | (x1,y1) |
| 18:10:00 | (x2,y2) |
| 18:20:00 | (x3,y3) |
| 18:30:00 | (x4,y4) |
| 18:40:00 | (x5,y5) |

FIG. 13

| TIME | COMMUNICATION SPEED |
|---|---|
| 18:30:00 | 2Mbps |
| 19:00:00 | 384Kbps |
| 19:30:00 | 42Mbps |

INFOS

FIG. 14

| TIME | APPLICATION NAME | SCREEN NAME | |
|---|---|---|---|
| 18:46:43 | A | A-MAIN SCREEN | INFOT_1 |
| 18:46:44 | A | A-LOGIN SCREEN | INFOT_2 |
| ... | ... | ... | |
| 02:00:00 | C | C-UPDATE SCREEN | INFOT_3 |

INFORMATION PROCESSING APPARATUS

TECHNICAL FIELD

The present information relates to an information processing apparatus.

BACKGROUND ART

Conventionally, it has become very common, when using a computer, to save a log indicative of operations of the computer and to use the log to provide services. For example, Patent Document 1 discloses an information processing apparatus that uses a log indicative of content browsed by a user to provide content suitable for the interests of the user. The information processing apparatus deletes part of the log indicative of the content browsed by the user based on the number of times the user browsed the content and the number of times the user viewed the content, and determines what content to provide to the user based on the log with parts deleted.

Each screen displayed by the information processing apparatus is displayed under the management of software. A program module may be assigned to each screen. In that case, since a log indicative of the usage history of program modules indicates the transition of screens displayed by the information processing apparatus, the log can be useful for estimating the state of the user, such as a state in which the user is confused about an operation or a state in which the user is performing a familiar operation.

RELATED ART DOCUMENT

Patent Document

Patent Document 1: Japanese Patent Application Laid-Open Publication No. 2013-205936

SUMMARY OF THE INVENTION

Problem to be Solved by the Invention

However, the number of log records indicative of the usage history of the program modules is enormous, and there is a problem in that processing load is high when the state of the user is estimated using all of the records. In order to reduce the processing load, it is necessary to determine which records should not be used to estimate the state of the user, but it is not clear which records are records that would not affect estimation accuracy. The technique described in Patent Document 1 is to reduce the browsing history of content for the purpose of estimating the content suitable for the interests of the user. Therefore, this is different from contents of the log to be reduced when reducing the log of the usage history of the program modules for the purpose of estimating the state of the user. Thus, the technique described in Patent Document 1 is not applicable to reducing the log of the usage history of program modules.

Means of Solving the Problems

In order to solve the above problems, in an information processing apparatus according to a preferred aspect of the present invention, an information generation apparatus includes a feature information generator configured to generate feature information on a transition to a first screen based on a log including a transition timepoint and identification information, the transition timepoint being a timepoint when a foreground screen transitioned from a second screen to the first screen, with the first and second screens being among a plurality of screens displayed by a plurality of program modules that differ from each other, and the identification information identifying, from among the plurality of program modules, a first program module for displaying the first screen, an index value generator configured to generate based on the feature information an index value indicative of a degree to which the first screen attracts the attention of a user, and a determiner configured to determine, based on the index value, whether to use the identification information in a process of estimating a state of the user.

Effect of the Invention

According to the present invention, it is possible to reduce the processing load while ensuring accuracy with which states of users can be estimated.

BRIEF DESCRIPTION OF THE DRAWINGS

FIG. 2 is a diagram showing an example of storage contents of a screen log LG.

FIG. 4 is a diagram showing a list of information that can be included in feature information INFOF.

FIG. 6 is a diagram showing an example of storage contents of lighted period information INFOL.

FIG. 7 is a diagram showing an example of storage contents of remaining battery information INFOB1.

FIG. 8 is a diagram showing an example of storage contents of battery consumption information INFOB2.

FIG. 9 is a diagram showing an example of storage contents of connection period information INFOW.

FIG. 13 is a diagram showing an example of storage contents of speed information INFOS.

FIG. 14 is a diagram showing an example of storage contents of time information INFOT.

MODES FOR CARRYING OUT THE INVENTION

1. Embodiment

Figure 1:
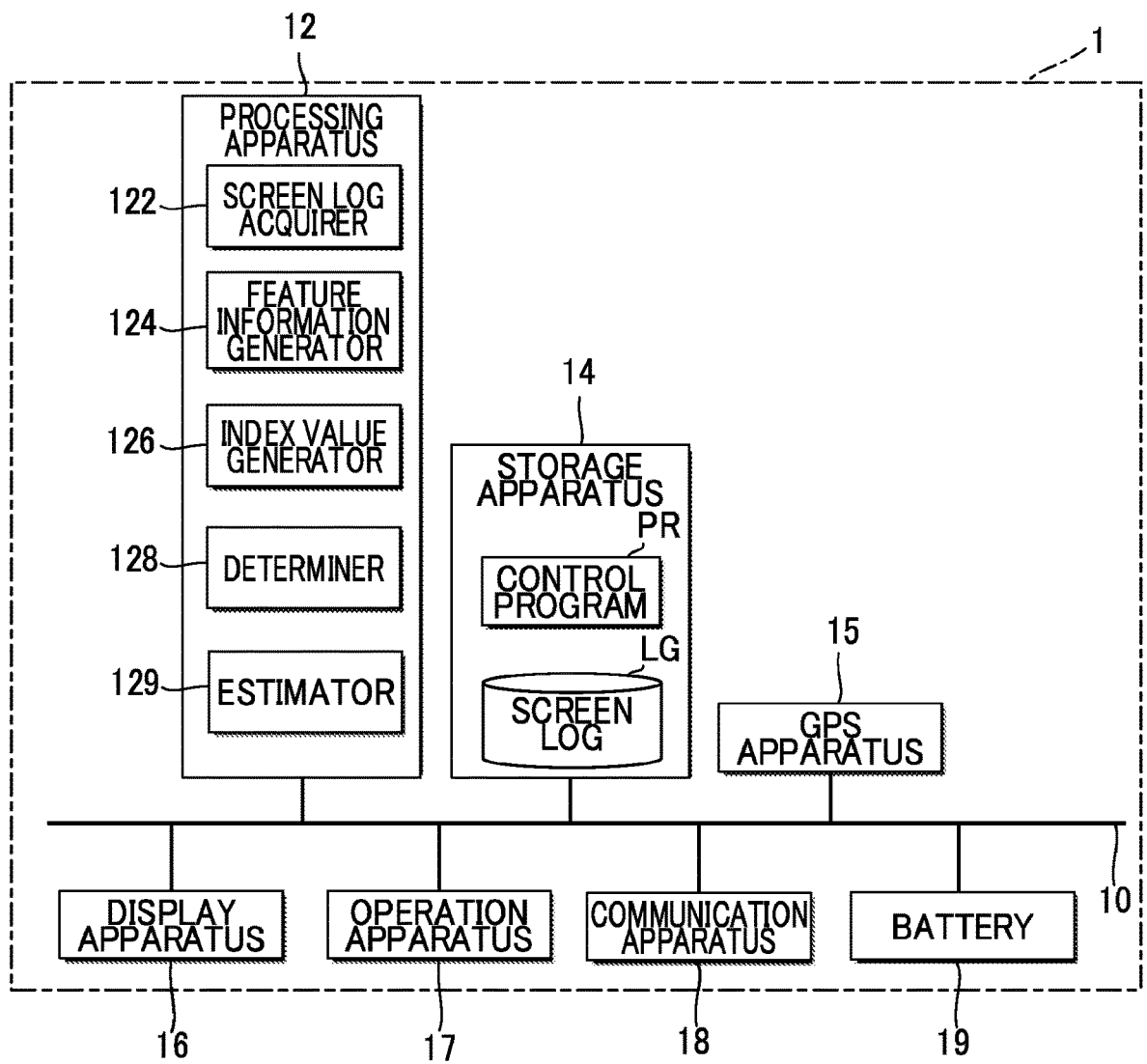
FIG. 1 is a block diagram showing an information processing apparatus according to an embodiment of the present invention.

FIG. 1 is a block diagram showing an information processing apparatus 1 according to an embodiment of the present invention. The information processing apparatus 1 is assumed to be a smartphone. However, as the information processing apparatus 1, any information processing apparatus can be adopted, and for example, it may be a terminal type information device such as a personal computer, and it may be a portable information terminal such as a laptop computer, a wearable terminal, and a tablet terminal.

The information processing apparatus 1 is implemented by a computer system including a processing apparatus 12, a storage apparatus 14, a GPS (Global Positioning System) apparatus 15, a display apparatus 16, an operation apparatus 17, a communication apparatus 18, and a battery 19. Elements of the information processing apparatus 1 are connected to each other by one or more buses 10 for communicating information. It is to be noted that the term "apparatus" herein can be replaced with another term such as "circuitry," "device," or "unit." Each element of the information processing apparatus 1 is constituted of one or more devices, and some elements of the information processing apparatus 1 may be omitted.

The information processing apparatus 1 executes application software by a user operation, and it displays a screen managed by the application software on the display apparatus 16. In the following description, the application software is simply referred to as "application." The state of the user can be accurately estimated by, in a process of estimating the state of the user, using a screen log LG representative of when and which screen was used by the user. Hereinafter, the process of estimating the state of the user is simply referred to as "estimation process." The estimation process is, for example, a process of estimating whether the user is confused about the operation of the screen or a process of estimating the state of psychological stress of the user.

Since the screen log LG can be privacy information, it is desirable that the screen log LG not be transmitted to an external apparatus and the screen log LG be analyzed inside the information processing apparatus 1. However, since the amount of data in the screen log LG is large, if all records of the screen log LG are used in the estimation process, the processing load of the information processing apparatus 1 will be high. Accordingly, the information processing apparatus 1 identifies which records will not contribute to the enhancement of estimation accuracy among the records of the screen log LG, and determines that the identified records are records not to be used in the estimation process.

The processing apparatus 12 is a processor that controls the entirety of the information processing apparatus 1, and it is constituted of, for example, one or more chips. The processing apparatus 12 includes, for example, an interface with a peripheral apparatus, and a central processing unit (CPU) including a calculation apparatus, a register, and the like. It is to be noted that some or all of the functions of the processing apparatus 12 may be implemented by hardware such as a DSP (Digital Signal Processor), an ASIC (Application Specific Integrated Circuit), a PLD (Programmable Logic Device), or an FPGA (Field Programmable Gate Array). The processing apparatus 12 performs various processes in parallel or in sequence.

The storage apparatus 14 is a recording medium that the processing apparatus 12 can read, and it stores a plurality of programs, including a control program PR executed by the processing apparatus 12 and the screen log LG. The storage apparatus 14 is constituted of one or more types of storage circuits such as a ROM (Read Only Memory), an EPROM (Erasable Programmable ROM), an EEPROM (Electrically Erasable Programmable ROM), and a RAM (Random Access Memory).

FIG. 2 is a diagram showing an example of storage contents of the screen log LG. The screen log LG includes a screen name and transition time of the screen. The screen is displayed on the display apparatus 16 by a program module which is a part of the programs stored in the storage apparatus 14. The storage apparatus 14 stores a plurality of program modules that differ from each other. The plurality of program modules display a plurality of screens on the display apparatus 16. The screen name is an example of "identification information that identifies a program module." When a freely selected screen among the screens is referred to as a "first screen," the transition time to the first screen is a timepoint when, with regard to the first screen identified by the screen name, a screen in a foreground transitioned to the first screen from a second screen different from the first screen. The screen log LG is an example of the "log." A program module that displays the first screen is an example of a "first program module." A screen that transitions to the foreground subsequent to the first screen is an example of a "third screen." The screen in the foreground is an example of a "foreground screen." The screen log LG is an example of the "log."

The screen log LG shown in FIG. 2 is information in which time, an operation type, an application name, and a screen name are associated. The screen log LG shown in FIG. 2 includes a record LG1_1 to a record LG1_12. The time indicates a timepoint when an operation occurred on the screen identified by the screen name. It is to be noted that FIG. 2 shows an example in which the time in the screen log LG indicates a timepoint in a freely selected day, for simplicity of illustration, but in actuality, a date and time including not only the time but also the date is included in each record. The operation type includes foreground and background. The application name is the name of an application that corresponds to a screen when an operation occurs on the screen, and the screen name is the name of the screen when the operation occurs on the screen.

For example, the record LG1_1 indicates that a screen that is managed by an application having the application name "A" and that has the screen name "main screen" transitioned to the foreground at 18:46:43. For simplicity of description, a screen managed by an application may be represented as "application name-screen name" in the description and drawings.

As an example of the transition time of the screen, the record LG1_3 indicates that the time of transition to an A-login screen is 18:46:44.

Description now returns to FIG. 1. The GPS apparatus 15 receives radio waves from a plurality of satellites, and it identifies the location of the information processing apparatus 1 from the received radio waves.

The display apparatus 16 displays various images under control by the processing apparatus 12. Various display panels such as a liquid crystal display panel or an organic EL (Electroluminescent) display panel are suitably used as the display apparatus 16. The display apparatus 16 may be turned off to reduce the amount of the battery 19 consumed or by user operation.

The operation apparatus 17 is a device for a user to input information used by the information processing apparatus 1. The operation apparatus 17 receives an operation by the user. Specifically, the operation apparatus 17 receives an operation for inputting codes, such as numbers and characters, and an operation for selecting an icon displayed by the display apparatus 16. For example, a touch panel that detects contact with the display surface of the display apparatus 16 is suitable as the operation apparatus 17. The operation apparatus 17 may include an operator that can be operated by the user. The operator is, for example, a touch pen.

The communication apparatus 18 is hardware (transmitting/receiving device) for communicating with another apparatus via a network. The communication apparatus 18 is also referred to as, for example, a network device, a network controller, a network card, or a communication module. The communication apparatus 18 may include, for example, a high frequency switch, a duplexer, a filter, and a frequency synthesizer for implementing one or both of frequency division duplex (FDD) and time division duplex (TDD).

In the embodiment, the communication apparatus 18 is a wireless LAN (Local Area Network) communication module, and it is able to connect to a wireless LAN access point in the vicinity of the communication apparatus 18 in accordance with IEEE 802.11 (Wi-Fi). The communication apparatus 18 is able to connect to a server apparatus (not shown) via the network.

The battery 19 supplies power to the information processing apparatus 1. As the battery 19, for example, a lithium ion battery can be adopted.

1.1. Functions of the Information Processing Apparatus 1

The processing apparatus 12 reads and executes the control program PR from the storage apparatus 14 and thereby functions as a screen log acquirer 122, a feature information generator 124, an index value generator 126, a determiner 128, and an estimator 129. The screen log acquirer 122 is an example of an "acquirer." The functions implemented by the processing apparatus 12 will be described with reference to FIGS. 3A and 3B.

Figure 3A:
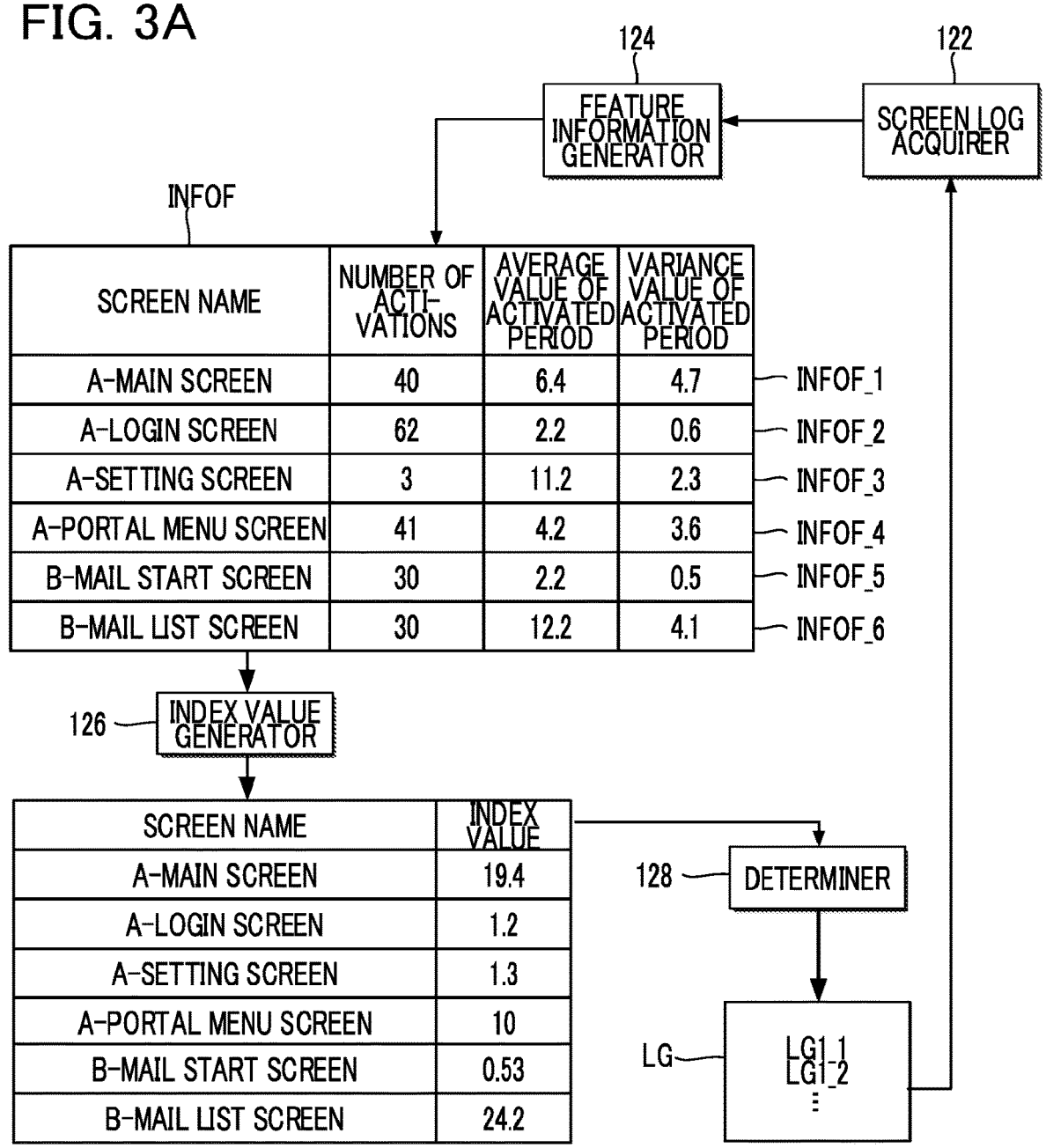
FIG. 3A is a diagram showing an outline of functions of the information processing apparatus 1.
Figure 3B:
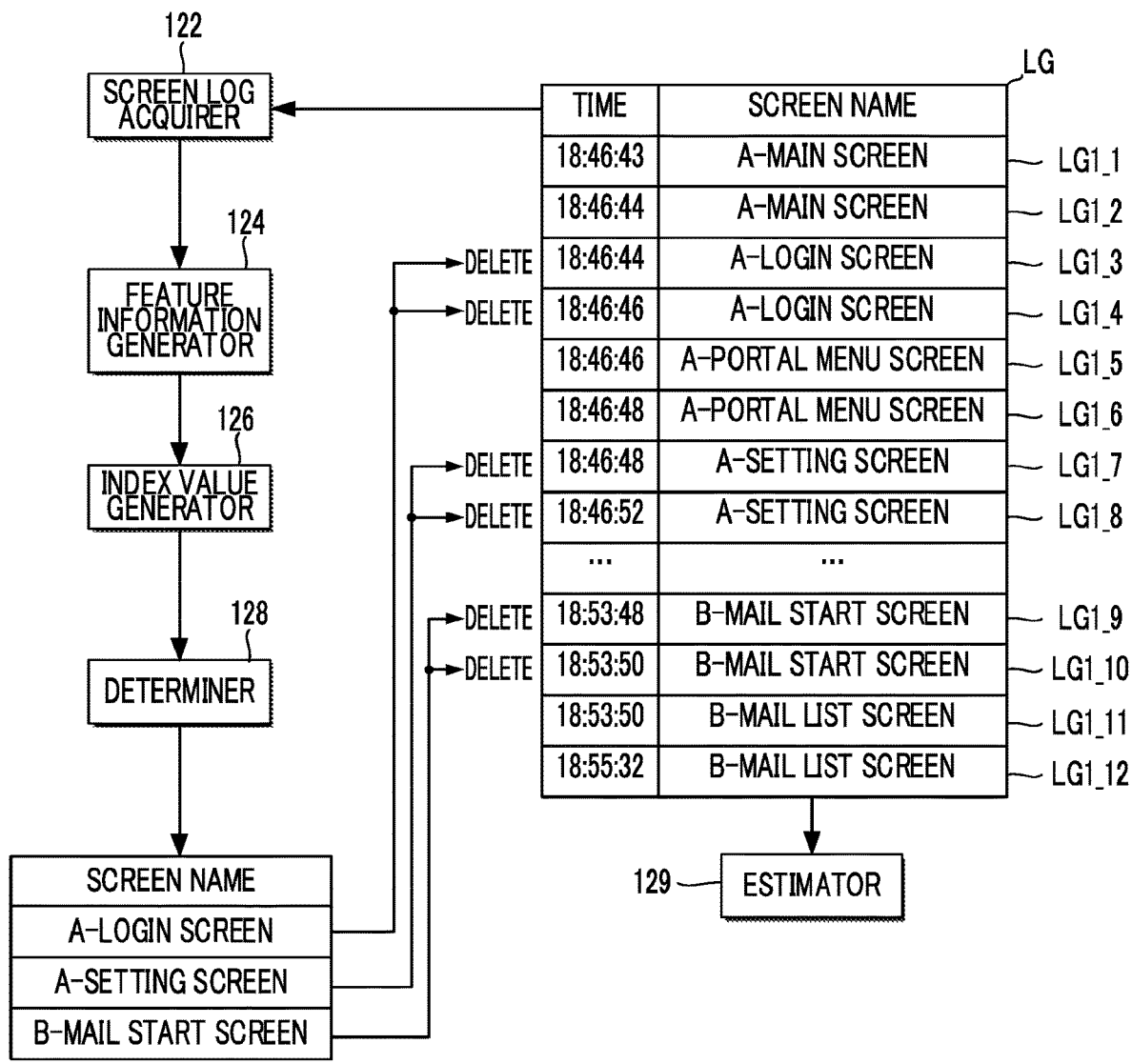
FIG. 3B is a diagram showing an outline of the functions of the information processing apparatus.

FIGS. 3A and 3B are diagrams showing an outline of the functions of the information processing apparatus 1. The screen log acquirer 122 acquires the screen log LG from the storage apparatus 14. In the screen log LG shown in FIG. 3B, illustration of the operation type and the application name is omitted in order to avoid complicating the drawing.

The feature information generator 124 generates feature information INFOF on transition of the screen based on the screen log LG. The feature information INFOF generated by the feature information generator 124 can have one of the following eight modes. The eight modes of the feature information INFOF will be described with reference to FIG. 4.

FIG. 4 is a diagram showing a list of information that can be included in the feature information INFOF. The Table 400 shown in FIG. 4 includes: a record 401_1 to a record 401_4; a record 402_1 to a record 402_3; a record 403_1; a record 403_2; a record 404; a record 405_1; a record 405_2; a record 406_1; a record 406_2; a record 407; and a record 408. As shown in the Table 400, the information that can be included in the feature information INFOF is divided into groups of the same type of elements, and each group will be described. In the following description, when the elements of the same type are distinguished, reference signs like the record 401_1 and the record 401_2 will be used. Conversely, when the elements of the same type are not distinguished, only one common number of the reference signs will be used, such as record 401.

First Mode

A first mode of the feature information INFOF includes information on the number of activations indicated in the record 401 and information on an activated period indicated in the record 402. More specifically, the first mode of the feature information INFOF includes, in the screen log LG, at least one of the total number of activations of the first screen, an average value of the number of activations of the first screen over a plurality of unit periods, a variance value of the number of activations of the first screen over a plurality of unit periods, a difference between the maximum value and the minimum value of the number of activations of the first screen over a plurality of unit periods, an average value of lengths of a plurality of activated periods of the first screen (periods during which the first screen is in an activated state), a variance value of the lengths of the activated periods of the first screen, and a difference between the maximum value and the minimum value of the lengths of the activated periods of the first screen.

The total number of activations is an example of "the total number of times the foreground screen transitioned to the first screen in the log." The variance value of the number of activations over the unit periods and the difference between the maximum value and the minimum value of the number of activations over the unit periods are examples of "dispersion of the number of times the foreground screen transitioned to the first screen over the unit periods." The average value of lengths of the activated periods is an example of "the average value of the lengths of the activated periods until the foreground screen transitioned to the third screen from a point when the foreground screen transitioned to the first screen." The variance value of lengths of the activated periods and the difference between the maximum value and the minimum value of the lengths of the activated periods are examples of "dispersion of the lengths of the activated periods until the foreground screen transitioned to the third screen from a point when the foreground screen transitioned to the first screen." The unit period may be any length of time, but in the situation in which the information processing apparatus 1 is used in daily life, it is preferable that the unit period be sufficiently longer than the time length one activated period can take. The unit period is, for example, one hour or one day. The unit period for the average value of the number of activations and the unit period for the variance value of the number of activations may have the same time length or may have different time lengths from each other.

The activated period is a period from a point in time (date and time) when a screen is activated until a point in time (date and time) when the screen transitions to the background. A screen activated by user operation usually transitions to the foreground at the same time as the screen is activated. In contrast, as a type of service of an OS (Operating System), a screen managed by an update program that corrects vulnerabilities of security may be activated at a predetermined point in time. Such a screen may be activated in the background. In the embodiment, for simplicity of description, it is assumed that the screen is set to the foreground at the same time as the screen is activated. Accordingly, in the embodiment, the activated period of the screen is a period from a point in time (date and time) when the first screen was activated in the foreground until a point in time (date and time) when the first screen transitioned to the background.

Second Mode

A second mode of the feature information INFOF includes information on screens activated before and after in a timewise manner, shown in the record 403. More specifically, the second mode of the feature information INFOF includes the number of types of the second screen activated before the first screen or the number of types of the third screen activated after the first screen.

Figure 5:
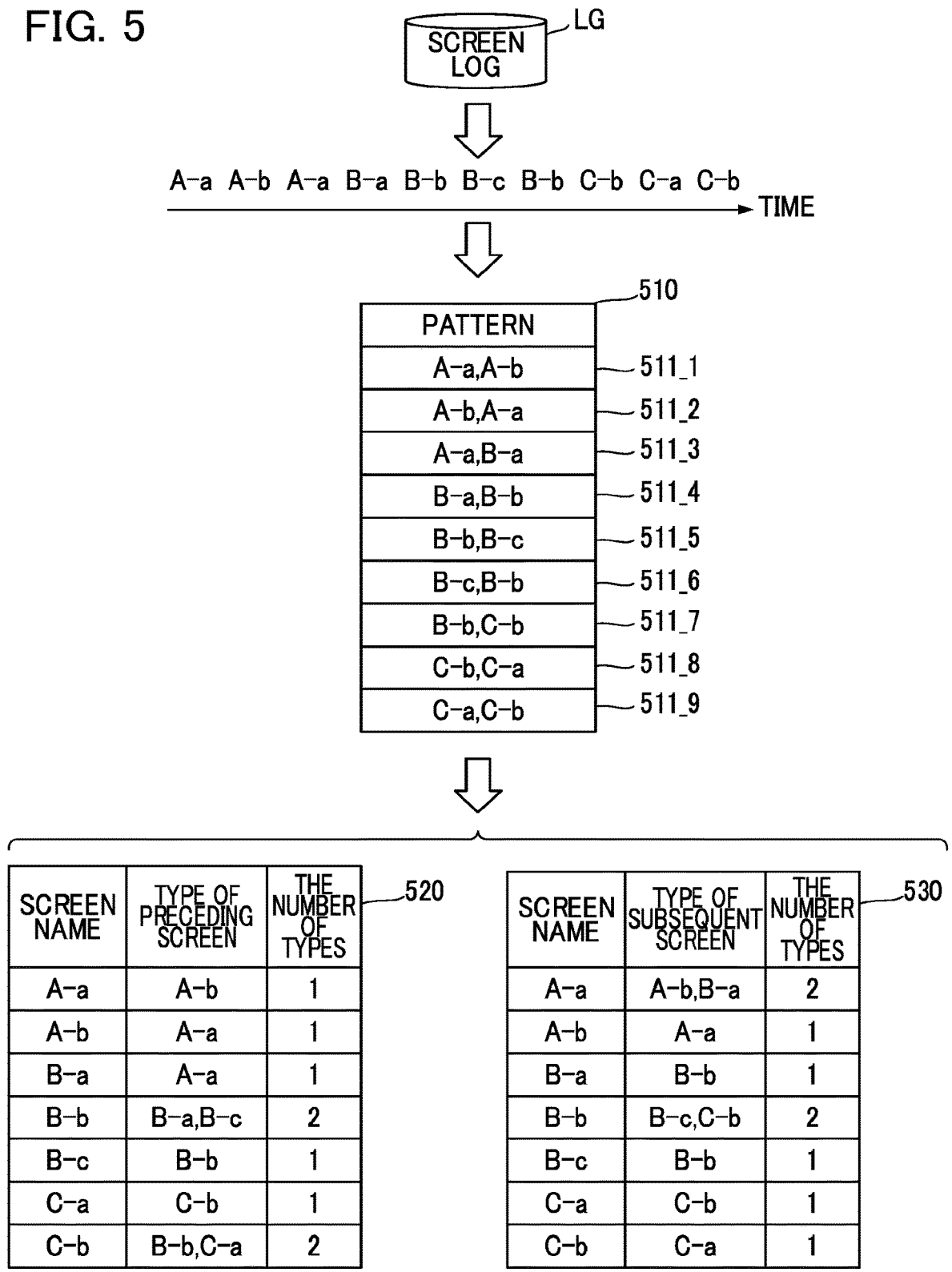
FIG. 5 is a diagram showing an example of a method for identifying the number of types of screen activated before a first screen and the number of types of screen to be activated after the first screen.

The number of types of the second screen activated before the first screen is an example of "the number of types of the second screen before the foreground screen transitioned to the first screen." The number of types of the third screen activated after the first screen is an example of "the number of types of the third screen to which the foreground screen transitioned from the first screen." A method for identifying the number of types of the second screen activated previously and the number of types of the third screen activated subsequently will be described with reference to FIG. 5.

FIG. 5 is a diagram showing an example of a method for identifying the number of types of a screen activated previously, and the number of types of a screen activated subsequently. The feature information generator 124 uses an N-gram to identify the number of types of the screen activated previously, and the number of types of the screen activated subsequently. The N-gram is a text division method of dividing a freely-selected character string or text by consecutive n characters. Here, "n" is an integer of one or more. The feature information generator 124 divides a character string consisting of screen names included in the screen log LG and disposed in time series into a unit of two screen names. That is, one screen name is regarded as one character, and an N-gram is applied in which "n" is set to two. In the example of FIG. 5, it is assumed that the screen log LG shows operations that have occurred and that are in chronological order, as follows.

A-a, A-b, A-a, B-a, B-b, B-c, B-b, C-b, C-a, and C-b.

Therefore, the screen log LG shown in FIG. 5 indicates, for example, that the screen with the screen name A-a was first set to the foreground, and then the screen with the screen name A-b was set to the foreground.

The feature information generator 124 divides the screen names indicated by the screen log LG into pairs of two consecutive screen names, and outputs a Table 510 as a result of division. In the following description, a sequence of two screen names in each pair after division is referred to as a "pattern." One pattern has a screen name at an earlier point in time and a screen name at a later point in time. As indicated by a record 511_1 to a record 511_9 in the Table 510, the feature information generator 124 obtains nine patterns.

In identifying the number of types of screen activated before the first screen, the feature information generator 124 identifies patterns in which the screen name of the first screen occurs at a later point in time, and counts the number of types of screens occurring at an earlier point in time in the identified patterns. For example, if the screen name of the first screen is B-b, the feature information generator 124 identifies a pattern indicated by the record 511_4 and a pattern indicated by the record 511_6 as patterns in which B-b occurs at a later point in time. Then, because the screen name occurring at an earlier point in time in the pattern indicated by the record 511_4 is B-a, and the screen name occurring at an earlier point in time in the pattern indicated by the record 511_6 is B-c, the feature information generator 124 determines that the number of types of the screen activated before the screen with the screen name B-b is 2. The feature information generator 124 similarly performs determinations for screens having screen names other than B-b, and outputs a Table 520.

In the case of identifying the number of types of screen activated after the first screen, the feature information generator 124 identifies patterns in which the screen name of the first screen occurs at an earlier point in time, and counts the number of types of the screen name occurring at a later point in time in the identified patterns. For example, if the screen name of the first screen is A-a, the feature information generator 124 identifies a pattern indicated by the record 511_1 and a pattern indicated by the record 511_3 as patterns in which A-a occurs at an earlier point in time. Then, since the screen name occurring at a later point in time in the pattern indicated by the record 511_1 is A-b, and the screen name occurring at a later point in time in the pattern indicated by the record 511_3 is B-a, the feature information generator 124 determines that the number of types of the screen activated after the screen with the screen name A-a is 2. The feature information generator 124 similarly performs determinations for screens having screen names other than A-a, and outputs a Table 530.

Third Mode

Description now returns to FIG. 4. A third mode of the feature information INFOF includes information on the display apparatus 16 indicated in the record 404. More specifically, the third mode of the feature information INFOF includes a rate at which the display apparatus was lit at a time of first screen activation. The display apparatus lighted rate is calculated by the following formula (1).

$$\text{Display apparatus lighted rate at an activation timepoint of the first screen} = \text{the total number of times that the display apparatus 16 was lit when the first screen was activated in the screen log } LG/\text{the total number of activations of the first screen in the screen log } LG \quad (1).$$

In order to calculate the formula (1), in the third mode of the feature information INFOF, the screen log LG includes lighted period information INFOL indicative of a period during which the display apparatus 16 was lit.

FIG. 6 is a diagram showing an example of storage contents of the lighted period information INFOL. The lighted period information INFOL shown in FIG. 6 indicates that periods during which the display apparatus 16 was lit were 18:25:00 to 18:59:22 and 19:02:01 to 21:55:45.

When the period indicated by the lighted period information INFOL includes a time of the screen activation, it indicates that the display apparatus 16 was lit at the activation timepoint of the screen. When the period indicated by the lighted period information INFOL does not include the time of the screen activation, it indicates that the display apparatus 16 was not lit at the time of the screen activation. The display apparatus lighted rate at an activation timepoint of the screen is an example of "information representative of a ratio of the total number of times the display apparatus was lit when the foreground screen transitioned to the first screen in the log to the total number of times the foreground screen transitioned to the first screen in the log."

Fourth Mode

Description now returns to FIG. 4. A fourth mode of the feature information INFOF includes information on the remaining amount of the battery 19 indicated in the record 405. More specifically, the fourth mode of the feature information INFOF includes an average value of the amounts of the battery 19 remaining at a plurality of screen activation timepoints or a variance value of the remaining amounts of the battery 19 at the plurality of screen activation timepoints when the first screen was activated a plurality of times. In the fourth mode of the feature information INFOF, the screen log LG includes remaining battery information INFOB1 indicative of the amounts of the battery 19 remaining at the respective different timepoints. The plurality of timepoints in the remaining battery information INFOB1 have, for example, the following two modes. In the first mode, the plurality of timepoints are at predetermined intervals. In the second mode, the plurality of timepoints are when the first screen was activated, i.e., when the first screen transitioned to the foreground. In the following description, the description is made assuming that the plurality of timepoints are in the first mode.

FIG. 7 is a diagram showing an example of storage contents of the remaining battery information INFOB1. As shown in FIG. 7, the remaining battery information INFOB1 indicates that the amounts of the battery 19 remaining were 80%, 70%, 55%, and 50% at a plurality of timepoints 18:00:00, 18:30:00, 19:00:00, and 19:30:00, respectively.

When a timepoint that corresponds to the screen activation timepoint is not included in the remaining battery information INFOB1, the feature information generator 124 identifies the amount of the battery 19 remaining at an activation timepoint of the screen by using, for example, linear interpolation. The variance value of the remaining amounts of the battery 19 at the plurality of screen activation timepoints is an example of "dispersion of the remaining amounts at a plurality of timepoints when the foreground screen transitioned to the first screen."

Fifth Mode

Description now returns to FIG. 4. A fifth mode of the feature information INFOF includes information on an amount of the battery 19 consumed indicated in the record 406. More specifically, the fifth mode of the feature information INFOF includes an average value of the consumption amounts of the battery 19 over a plurality of screen activated periods or a variance value of the consumption amounts of the battery 19 over the plurality of screen activated periods when the first screen was activated a plurality of times. In the fifth mode of the feature information INFOF, the screen log LG includes battery consumption information INFOB2 indicative of the amount of the battery 19 consumed for each unit period.

FIG. 8 is a diagram showing an example of storage contents of the battery consumption information INFOB2. As shown in FIG. 8, the battery consumption information INFOB2 indicates that the amounts of the battery 19 consumed were 10%, 15%, and 5% during a unit period of 18:00:00 to 18:30:00, a unit period of 18:30:00 to 19:00:00, and a unit period of 19:00:00 to 19:30:00, respectively.

From among the consumed amounts indicated by the battery consumption information INFOB2, the amount of the battery 19 consumed in one activated period is an amount of the battery consumed in the activated period out of a consumed amount that corresponds to a unit period overlapping the activated period. For example, the feature information generator 124 is able to calculate the consumed amount of the battery 19 in the screen activated period by multiplying a length (for example, in minutes) of the activated period of the first screen by an amount consumed in a unit period that overlaps the activated period of the first screen from among the consumed amounts indicated by the battery consumption information INFOB2, and dividing the product by the length of the unit period (for example, in minutes). The amount of the battery 19 consumed is a value obtained by subtracting the remaining amount of the battery 19 at an end time of the unit period from the remaining amount of the battery 19 at a start time of the unit period, when the battery 19 is not being charged.

For example, it is assumed that the first screen was activated twice; a first activated period of the first screen was 18:00:00 to 18:06:00, and a second activated period was 18:35:00 to 18:37:00. That is, the length of the first activated period was 6 minutes and the length of the second activated period was 2 minutes. The consumed amount indicated by the battery consumption information INFOB2 in a unit period that overlapped the first activated period was 10%. Therefore, the amount of the battery 19 consumed in the first screen activated period for the first time was 6 (minutes)×10(%)/30 (minutes)=2(%). The consumed amount indicated by the battery consumption information INFOB2 at a unit period that overlapped the activated period for the second time was 15%. Therefore, the amount of the battery 19 consumed in the activated period for the second time is 2 (minutes)×15(%)/30 (minutes)=1(%).

The variance value of the consumed amounts of the battery 19 over the plurality of activated periods is an example of "dispersion in the consumed amount over the plurality of activated periods until the foreground screen transitioned to the third screen from a point when the foreground screen transitioned to the first screen."

Sixth Mode

Description now returns to FIG. 4. A sixth mode of the feature information INFOF includes information on the communication apparatus 18 indicated in the record 407. More specifically, the sixth mode of the feature information INFOF includes a Wi-Fi connection rate at an activation timepoint of the first screen. The Wi-Fi connection rate at an activation timepoint of the first screen is calculated by the following formula (2).

Wi-Fi connection rate at an activation timepoint of the first screen=the total number of times that Wi-Fi connection was established when the first screen was activated in the screen log LG/the total number of activations of the first screen in the screen log LG    (2).

In order to calculate the formula (2), in the sixth mode of the feature information INFOF, the screen log LG is configured to include connection period information INFOW indicative of a period during which connection between the information processing apparatus 1 and the wireless LAN access point was established.

FIG. 9 is a diagram showing an example of storage contents of the connection period information INFOW. The connection period information INFOW shown in FIG. 9 indicates that periods during which the connection with the wireless LAN access point was established were 18:26:10 to 18:58:22 and 19:02:10 to 19:05:45. The information processing apparatus 1 is an example of an "information processing apparatus that displays a plurality of screens." The Wi-Fi connection rate at an activation timepoint of the screen is an example of "information representative of a ratio of the total number of times that the connection was established when the foreground screen transitioned to the first screen in the log, to the total number of times the foreground screen transitioned to the first screen in the log.

Seventh Mode

Description now returns to FIG. 4. A seventh mode of the feature information INFOF includes information on a location indicated in the record 408. More specifically, the seventh mode of the feature information INFOF includes the total number of times that the information processing apparatus 1 was located at a predetermined location at an activation timepoint of the first screen in the screen log LG. An example of the "predetermined location" is a POI (Point Of Interest). The POI is a location the user is interested in. The information processing apparatus 1 identifies in advance locations where the information processing apparatus 1 has dwelled for a predetermined time or longer as POIs.

Figures 10, 11:
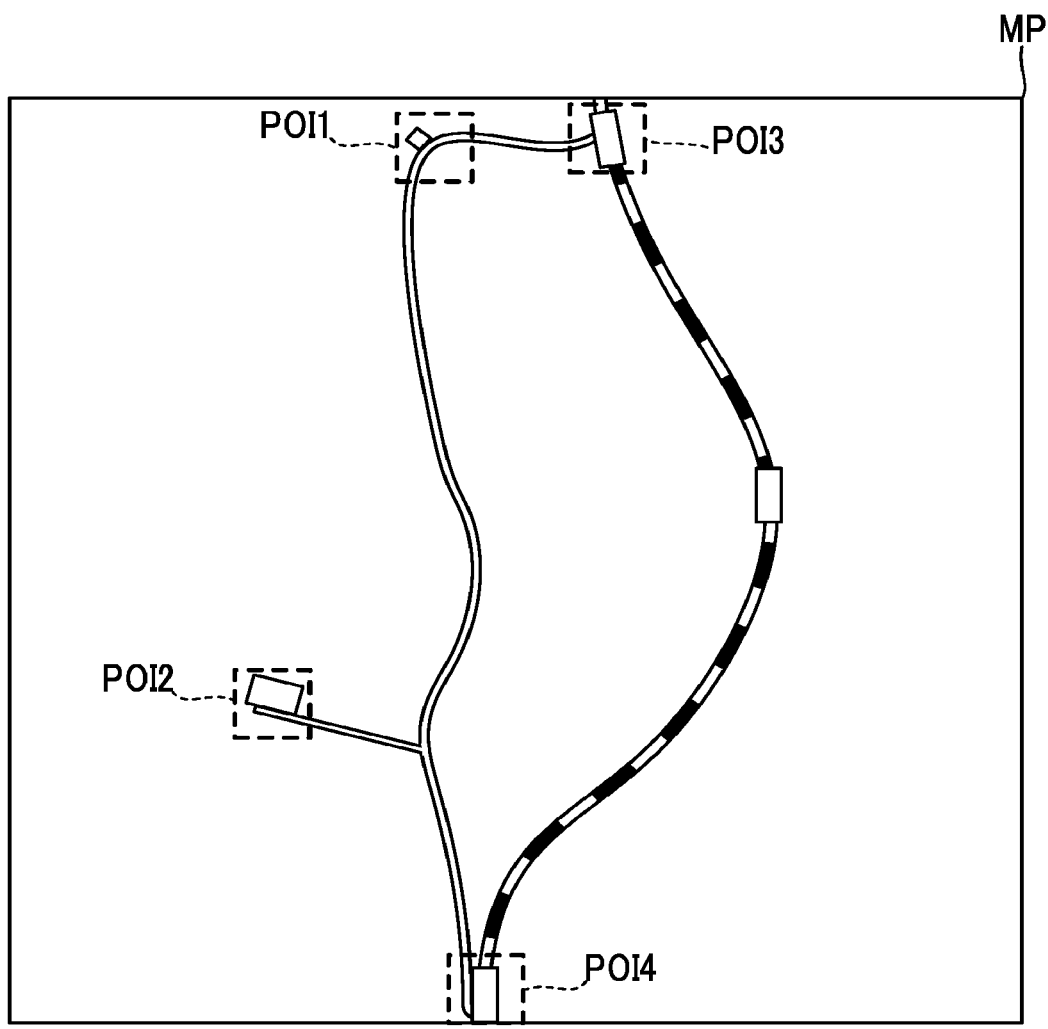
FIG. 10 is a diagram showing an example of POIs.
FIG. 11 is a diagram showing an example of storage contents of location information INFOP.

FIG. 10 is a diagram showing an example of the POIs. A map MP shown in FIG. 10 indicates locations of a POI 1 to a POI 4 identified as POIs. The POI 1 indicates the location of the home of the user of the information processing apparatus 1. The POI 2 indicates the location of the workplace of the user. The POI 3 indicates the location of the nearest station from the home. The POI 14 indicates the location of the nearest station from the workplace.

In order to determine whether the information processing apparatus 1 is at the POI at an activation timepoint of the screen, in the seventh mode of the feature information INFOF, the screen log LG includes location information INFOP indicative of the locations of the information processing apparatus 1 at respective different timepoints. The location information INFOP indicates the location of the information processing apparatus 1 by latitude and longitude. The information processing apparatus 1 generates the location information INFOP based on the location of the information processing apparatus 1 determined by the GPS apparatus 15.

FIG. 11 is a diagram showing an example of storage contents of the location information INFOP. As shown in FIG. 11, the location information INFOP indicates that locations of the information processing apparatus 1 at 18:00:00, 18:10:00, 18:20:00, 18:30:00, at 18:40:00 were (x1, y1), (x2, y2), (x3, y3), (x4, y4), and (x5, y5), respectively. The x1, x2, x3, x4, and x5 indicate longitude, and the y1, y2, y3, y4, and y5 indicate latitude.

When a timepoint corresponding to an activation timepoint of the first screen is not included in the location information INFOP, the feature information generator 124 identifies the location of the information processing apparatus 1 at the activation timepoint of the first screen by interpolation from locations at two timepoints before and after the activation timepoint in the location information INFOP, and generates the identified location as the location information INFOP at the activation timepoint of the first screen. The feature information generator 124 counts the total number of times that the location information INFOP indicates the POI at the activation timepoint of the first screen in the screen log LG and includes the obtained total number in the feature information INFOF.

Eighth Mode

Description returns to FIG. 4. An eighth mode of the feature information INFOF is a combination of at least two modes from the first mode to the seventh mode of the feature information INFOF. For example, in a mode of combining the fourth mode and the seventh mode of the feature information INFOF, the feature information generator 124 generates the feature information INFOF that includes the average value of the remaining amounts of the battery 19 at the plurality of screen activation timepoints for the first screen, and the total number of times that the information processing apparatus 1 was located at the POI at the activation timepoint of the screen in the screen log LG. In the mode of combining the fourth mode and the seventh mode of the feature information INFOF, the screen log LG includes the remaining battery information INFOB1 and the location information INFOP. The plurality of timepoints of the remaining battery information INFOB1 and the plurality of timepoints of the location information INFOP may all be the same, may be different in part, or may all be different.

In the example of FIGS. 3A and 3B, the feature information generator 124 generates the feature information INFOF including the total number of activations, the average value of the lengths of the activated periods, and the variance value of the lengths of the activated periods for each of the screens. More specifically, the feature information generator 124 generates A-main screen feature information INFOF_1, A-login screen feature information INFOF_2, A-setting screen feature information INFOF_3, A-portal menu screen feature information INFOF_4, B-mail start screen feature information INFOF_5, and B-mail list screen feature information INFOF_6.

The index value generator 126 generates an index value indicative of a degree to which each screen draws the attention of the user based on the feature information INFOF. The degree to which a screen draws the attention of the user is hereinafter referred to as "degree of attention." The tendency of the degree of attention to the screen varies depending on the characteristics of information included in the feature information INFOF. The Table 400 indicates the tendency of the degree of attention to each piece of information that can be included in the feature information INFOF.

In the information on the total number of activations indicated in the record 401, as the total number of activations increases, the degree of attention tends to be higher. The degree of attention tends to be higher as the average value of the number of activations increases over the unit periods, as the variance value of the number of activations increases over the unit periods, or as the difference between the maximum value and the minimum value of the number of activations over the unit periods increases.

In the information on the activated period indicated in the record 402, as the average value of the activated periods over the plurality of unit periods increases, the degree of attention tends to be higher. As the variance value of the activated periods increases over the unit periods, and the difference between the maximum value and the minimum value of the activated periods increases over the unit periods, the degree of attention tends to be higher.

In the information on the screens activated before and after the first screen indicated in the record 403, as the number of types of the second screen activated previously increases and the number of types of the third screen activated subsequently increases, the degree of attention tends to be higher. In the information on the display apparatus 16 indicated in the record 404, as the rate at which the display apparatus is lit at an activation timepoint of the screen increases, the degree of attention tends to be higher.

In the information on the remaining amount of the battery 19 indicated in the record 405, as the average value of the amounts of the battery 19 remaining at the plurality of screen activation timepoints decreases, the degree of attention tends to be higher, and as the variance value of the amounts of the battery 19 remaining at the plurality of screen activation timepoints increases, the degree of attention tends to be higher. In the information on the amount of the battery 19 consumed indicated in the record 406, as the average value of the consumed amounts of the battery 19 during activation of the screen and the variance value of the amounts of the battery 19 consumed during activation of the screen increase, the degree of attention tends to be higher.

In the information on the communication apparatus 18 indicated in the record 407, as the Wi-Fi connection rate at an activation timepoint of the screen decreases, the degree of attention tends to be higher. In the information on the location indicated in the record 408, as the number of times that the information processing apparatus 1 was located at the POI at an activation timepoint of the screen increases, the degree of attention tends to be higher.

For information indicating that the degree of attention to the screen tends to be higher as a value increases, the index value generator 126 generates a larger index value as the value increases. In addition, for information indicating that the degree of attention to the screen tends to be higher as the value decreases, the index value generator 126 generates a larger index value as the value decreases. The index value generator 126 generates the index value by using, for example, the following formula (3) or formula (4).

Index value=Π(information for which degree of attention tends to be higher as the value $$\text{Index value} = \Pi(\text{information for which degree of attention tends to be higher as the value increases}) \times \Pi(\text{inverse of information for which degree of attention tends to be higher as the value decreases}) \quad (3)$$

$$\text{Index value} = \Pi(\text{information for which degree of attention tends to be higher as the value increases}) \times \Pi(\text{predetermined value} - \text{information for which degree of attention tends to be higher as the value decreases}) \quad (4)$$

Π denotes an operator indicative of a product of all elements. The predetermined value in the formula (4) is a value equal to or greater than the maximum value of information for which degree of attention tends to be higher as the value decreases.

When the number of activations is included in the feature information INFOF, the index value generator 126 is able to calculate the index value by using the following formula (3') instead of the formula (3).

$$\text{Index value} = (1/\text{maximum value of the number of times of activations of each screen}) \times \Pi(\text{information for which degree of attention tends to be higher as the value increases}) \times \Pi(\text{inverse of information for which degree of attention tends to be higher as the value decreases}) \quad (3')$$

In the examples of FIGS. 3A and 3B, the index value generator 126 generates the index value of each screen by using the formula (3'). The maximum value of the total number of activations of the respective screens is 62 times of the A-login screen. In addition, regarding the A-main screen, the total number of activations is 40 times, the average value of the lengths of the activated periods is 6.4 hours, and the variance value of the lengths of the activated periods is 4.7. The index value generator 126 generates, for example, the index value of the A-main screen as follows by using the formula (3').

$$\text{A-main screen index value} = \tfrac{1}{62} \times (\text{total number of activations} \times \text{average value of the lengths of the activated periods} \times \text{variance value of the lengths of the activated periods})$$

$$\text{A-main screen index value} = \tfrac{1}{62} \times (40 \times 6.4 \times 4.7) \approx 19.4$$

The determiner 128 determines, for each of the plurality of screens, whether a record including the screen name of the screen will be used in the estimation process based on the index value. Regarding specific methods for determining a screen that will not be used in the estimation process, for example, there are three methods as described below. In a first method, the determiner 128 determines that a screen having the index value equal to or less than a predetermined value will not be used in the estimation process. In a second method, the determiner 128 determines that a predetermined number of screens having smaller index values, counting from the smallest, will not be used in the estimation process. In a third method, the determiner 128 determines that screens having smaller index values counting from the smallest will not be used in the estimation process until a target reduction rate is reached, in which the reduction rate is a ratio of records related to screens that are not used in the estimation process to the number of all records of the screen log LG. The information processing apparatus 1 receives, for example, the target reduction rate from the user. The following description assumes that the determiner 128 has determined screens that will not be used in the estimation process by the third method.

The estimator 129 performs the estimation process by using records that include the screen names of screens to be used in the estimation process. For example, the estimator 129 obtains an estimation result by inputting the records including the screen names of the screens determined to be used in the estimation process in a learning model that was trained in advance. As modes of a process for screens that are determined not to be used in the estimation process, there are two modes described below. In a first mode, the determiner 128 deletes records LG1 that include the screen names of the screens determined not to be used in the estimation process. According to the first mode, it is possible to increase storage capacity available in the storage apparatus 14. In a second mode, the determiner 128 stores in the storage apparatus 14 the screen names of the screens determined not to be used in the estimation process. Then, the estimator 129 uses records LG1 that include screen names other than the stored screen names to perform the estimation process. According to the second mode, the records LG1 including the screen names determined not to be used in the estimation process can also be used in the processing when the screen log LG is used in processes other than the estimation process. The following description assumes that the mode of the process for the screens determined not to be used in the estimation process is the first mode.

In the examples of the FIGS. 3A and 3B, the determiner 128 determines the B-mail start screen, the A-login screen, and the A-setting screen to be screens not used in the estimation process. The screens which will not be used are determined in the order of screens having smaller index values until a predetermined ratio is reached, in which the ratio is a ratio of records related to the screen names that will not be used in the estimation process to the number of all the records. Then, the determiner 128 deletes the record LG1_9 and the record LG1_10 related to the B-mail start screen, the record LG1_7 and the record LG1_8 related to the A-setting screen, and the record LG1_3 and the record LG1_4 related to the A-login screen. The estimator 129 performs the estimation process by using records LG1 that are not deleted in the screen log LG.

1.2. Operation of the Embodiment

Next, a log deletion process performed by the information processing apparatus 1 (specifically, the processing apparatus 12) will be described with reference to FIG. 12.

Figure 12:
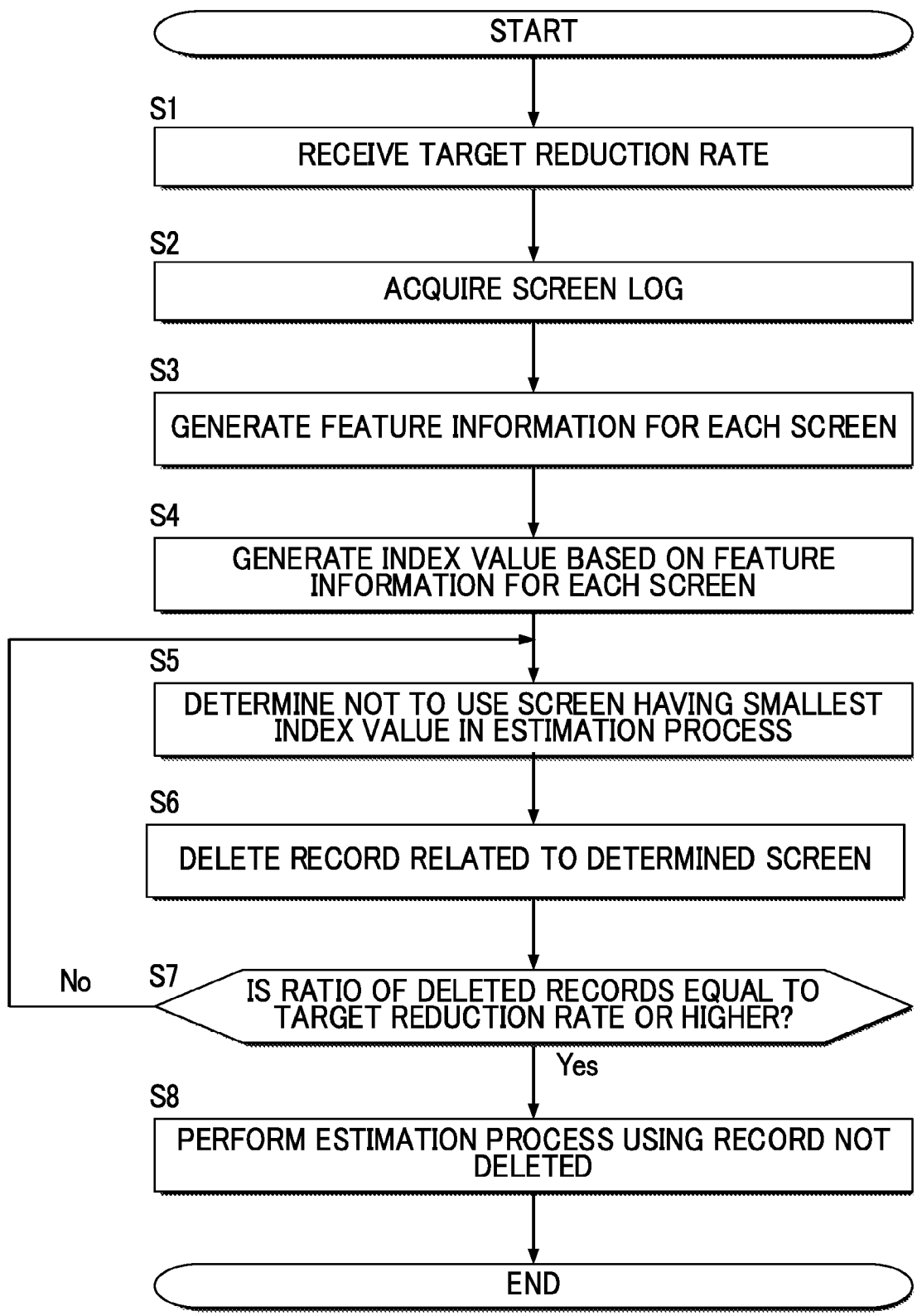
FIG. 12 is a flowchart showing a log deletion process.

FIG. 12 is a flowchart showing the log deletion process. The information processing apparatus 1 receives a target reduction rate by an operation carried out by the user (step S1). Next, the information processing apparatus 1 acquires the screen log LG from the storage apparatus 14 (step S2). Then, the information processing apparatus 1 generates feature information INFOF for each screen based on the screen log LG (step S3). Next, the information processing apparatus 1 generates an index value for each screen based on the feature information INFOF (step S4). Then, the information processing apparatus 1 determines not to use a screen having the smallest index value in the estimation process (step S5). The information processing apparatus 1 deletes records LG1 that include the determined screen name among the plurality of records LG1 included in the screen log LG (step S6).

Next, the information processing apparatus 1 determines whether the ratio of the deleted records LG1 is equal to or greater than the target reduction rate (step S7). When a determination result in step S7 is negative, that is, when the ratio of the deleted records LG1 is less than the target reduction rate, the information processing apparatus 1 returns the processing to step S5. On the other hand, when the determination result in step S7 is affirmative, the information processing apparatus 1 performs the estimation process using records LG1 that have not been deleted (step S8). After the process of step S8 ends, the information processing apparatus 1 ends the series of processes shown in FIG. 12.

1.3. Effect of the Embodiment

As described above, according to the embodiment, the information processing apparatus 1 includes the feature information generator 124 configured to generate feature information INFOF on the transition of a first screen based on a screen log LG, the index value generator 126 configured to generate an index value indicative of the degree of attention to the first screen, and the determiner 128 configured to determine based on the index value whether to use the first screen in the estimation process.

The log of a screen that does not draw the attention of the user is not likely to contribute to enhancement of estimation accuracy of the estimation process. For example, since the login screen is automatically activated and is not a screen activated by user operation, it can be said to be a screen that does not draw the attention of the user. Therefore, even if a record related to the login screen is not used in the estimation process for estimating the state of the user, the accuracy of the estimation process will not deteriorate. As described above, it is possible to reduce the load of the estimation process while ensuring the accuracy of the estimation process by determining, based on the degree of attention, not to use records that are related to a screen to which the user is not paying attention in the estimation process of estimating the state of the user.

The first mode of the feature information INFOF includes, in the screen log LG, at least one of the total number of activations, the average value of the number of activations over the unit periods, the dispersion of the number of activations over the unit periods, the average value of the activated periods, and the dispersion of the activated periods. The greater the total number of activations, the more screens are activated by the user, so it can be said that as the total number increases, the degree of attention is higher. If the average value of the number of activations is large, it means that the user repeats activations of a screen, so it can be said that as the average number increases, the degree of attention is higher. The variance value of the number of activations means that as it increases, the probability of being activated by manual operation increases, and as the variance value of the number of activations decreases, the probability of being activated automatically increases. For example, the variance value of the number of activations of a screen activated at a predetermined time is small. Therefore, it can be said that as the variance value of the number of activations increases, the degree of attention is higher.

As such, when the feature information INFOF includes the total number of activations, the average value of the number of activations over the unit periods, or the dispersion of the number of activations over the unit periods, it can be determined that records related to screens having a high probability of having been automatically activated without user operation are not used in the estimation process, so the load of the estimation process can be reduced while ensuring accuracy of the estimation process.

The longer the average value of the activated periods of a screen, the longer a user looks at the screen, so it can be said that as the average value increases, the degree of attention is higher. As such, when the feature information INFOF includes the average value of activated periods, it can be determined that records related to screens that a user looks at only for a short time are not used in the estimation process, so the load of the estimation process can be reduced. Furthermore, the screens that the user looks at only for a short time have a low degree of attention paid thereto, so it is also possible to ensure accuracy of the estimation process.

If the variance value of activated periods of a screen is large, it means that the screen is used in various situations, so it can be said that the user is paying attention to the screen. If the variance value of activated periods is small, the screen is likely to terminate automatically, so it can be said that the user is not paying attention to the screen. For example, regarding the login screen, in the case of automatic login, since the login screen ends immediately after activation, the length of the activated period of the login screen is nearly constant. Also, when the user inputs an account name and a password, the input speed of the user does not usually change greatly, so the length of the activated period of the login screen is nearly constant. Since the user activates the login screen to look at the main screen after the login screen, rather than the login screen itself, it can be said that the degree of attention paid to the login screen is less than the degree of attention paid to the main screen.

For example, when a program is activated, a splash screen may be activated. The splash screen is activated during activation of the program, and it basically terminates when the activation of the program is completed and switches to the main screen. Thus, the length of the activated period of the splash screen is nearly constant. Generally, since the user starts the program to view the main screen rather than the splash screen, it can be said that the degree of attention to the splash screen is lower than the degree of attention to the main screen. Therefore, it can be said that as the variance value of the lengths of the activated periods increases, the degree of attention is higher. As such, when the feature information INFOF includes the variance value of the activated periods, it can be determined that records related to screens of which the length of the activated period is constant are not used in the estimation process, so the load of the estimation process can be reduced. Furthermore, the screens of which the length of the activated period is constant have a low degree of attention paid, so it is also possible to ensure the accuracy of the estimation process.

The second mode of the feature information INFOF includes the number of types of the second screen activated before the first screen or the number of types of the third screen activated after the first screen. If the number of types of the second screen activated previously is large, it means that there were many screens that transitioned to the first screen. A screen to which many screens can transition has an important position in a program, so it can be said that the screen is highly likely to have drawn the attention of the user. Therefore, if the number of types of the second screen activated before the first screen is greater, it can be said that the degree of attention is higher. As such, when the feature information INFOF includes the number of types of the second screen activated before the first screen, it can be determined not to use records related to screens that are not important in programs in the estimation process, so the load of the estimation process can be reduced. Furthermore, screens not important in programs are not likely to draw the attention of the user, so it is also possible to ensure accuracy of the estimation process.

If the number of types of the third screen activated after the first screen is large, it indicates the user often ends a program to which the first screen belongs and activates the third screen of another program. One of the conceivable reasons for ending the program to which the first screen belongs may be that execution of the program to which the first screen belongs is no longer necessary because the user has achieved a purpose in the first screen. Thus, if the number of types of the third screen activated after the first screen is large, it means that the first screen is highly likely to be a target screen intended by the user. Therefore, as the number of types of the screen activated after the first screen increases, it can be said that the degree of attention is higher.

As such, when the feature information INFOF includes the number of types of the second screen activated after the first screen, it can be determined not to use, in the estimation process, records related to screens that are unlikely to be target screens intended by the user, so the load of the estimation process can be reduced. Furthermore, the screens unlikely to be target screens intended by the user have a low degree of attention paid, so it is also possible to ensure the accuracy of the estimation process.

The third mode of the feature information INFOF includes the display apparatus lighted rate at the activation timepoint of the first screen. When the display apparatus 16 is lit, the user can view the contents of the screen. On the other hand, when the display apparatus 16 is not lit, the user cannot view the contents of the screen. Therefore, if the rate the display apparatus is lit is low, it can be said that a ratio at which the user was unable to view the contents of the screen is high. As such, when the feature information INFOF includes the rate the display apparatus is lit at an activation timepoint of the screen, it can be determined not to use records related to screens of which contents were unlikely to be viewable by the user in the estimation process, so the load of the estimation process can be reduced. Furthermore, the screens of which the contents were unlikely to be viewable by the user have a low degree of attention, so it is also possible to ensure the accuracy of the estimation process.

The information processing apparatus 1 is assumed to be a smartphone. In a common type of smartphone powered by a battery, in order to reduce battery consumption, a time from a state in which the display apparatus is lit to a state in which the display apparatus is turned off when there is no input operation, is set to be shorter than that of a PC (Personal Computer). Furthermore, when the smartphone is placed in a bag or a pocket, in order to prevent erroneous operation of the touch panel, the user may manually turn off the display apparatus and disable functions of the touch panel. In this way, in the information processing apparatus 1, which is a smartphone, the display apparatus 16 is turned off more frequently than the PC, so it is more likely that the user was unable to view the contents of the screen even if the first screen was in the foreground. Therefore, by using the display apparatus lighted rate at an activation timepoint of the screen, the information processing apparatus 1 can generate an index value that reflects a ratio at which the user was able to truly confirm the contents of the screen.

The fourth mode of the feature information INFOF includes the average value of the amounts of the battery 19 remaining at a plurality of activation timepoints of the first screen, or the variance value of the amounts of the battery 19 remaining at a plurality of activation timepoints of the first screen. As the average value of the amounts of the battery 19 remaining at activation timepoints of the screen decreases, it means that the battery 19 is closer to a complete discharge state and that little time remains until the information processing apparatus 1 stops operating. It can be said that a screen that is activated, even if the time is short until the information processing apparatus 1 stops operating, is an important screen for the user. On the other hand, for example, a screen for an update may not be activated unless the remaining amount of the battery 19 is equal to or greater than a predetermined value in order to avoid the battery 19 from being completely discharged and data being lost during the update. Accordingly, the average value of the amounts of the battery 19 remaining at a plurality of activation timepoints of the screen for an update will be equal to or greater than the predetermined value. Hence, it can be said that the screen for an update is not important for the user.

If the variance value of the amounts in the battery 19 remaining at a plurality of activation timepoints of the first screen is large, the first screen is used in various situations, so it can be said the degree of attention of the user is high. On the other hand, like the aforementioned screen for an update, when a screen will not activate unless the remaining amount in the battery 19 is equal to or greater than the predetermined value, the variance value of the remaining amounts of the battery 19 at activation timepoints of the screen tends to be small. Therefore, when the feature information INFOF includes the average value or variance value of the amounts remaining in the battery 19 at the activation timepoints of the first screen, it can be determined not to use records related to screens that are not important for the user in the estimation process, so the load of the estimation process can be reduced. Furthermore, the screens which are not important for the user receive a low degree of attention, so it is also possible to ensure the accuracy of the estimation process.

The fifth mode of the feature information INFOF includes the average value of a plurality of amounts of the battery 19 consumed over a plurality of activated periods of the first screen or the variance value of a plurality of amounts of the battery 19 consumed over a plurality of activated periods. If the average value of the amounts of the battery 19 consumed is large, little time remains until the information processing apparatus 1 stops operating. It can be said that a screen which is activated even if the time is short until the information processing apparatus 1 stops operating is an important screen for the user. On the other hand, it can be said that as the average value of the consumption amounts of the battery 19 during screen activation is lower, the screen is of less importance to the user.

Therefore, when the feature information INFOF includes the average value of the consumption amounts of the battery 19 over the activated periods, it can be determined not to use records related to screens that are not important for the user in the estimation process, so the load of the estimation process can be reduced. Furthermore, the screens which are not important for the user may have a low degree of attention, so it is also possible to ensure the accuracy of the estimation process.

If the variance value of the amounts of the battery 19 remaining over the activated periods is large, it means that the screen is used in various usage modes. For example, in a list screen of SNS (Social networking) application, when the user is interested in a video posted by another user and plays back the video, the amount of the battery 19 consumed increases, whereas when the user is not interested in the video and does not play it back, the amount of the battery 19 consumed is reduced. It can therefore be said that screens used in various usage modes have a high degree of attention. On the other hand, if the variance value of the amounts of the battery 19 consumed is small, the first screen is likely to be used in one usage mode, and it can be said the degree of attention paid is low. Therefore, when the feature information INFOF includes the variance value of the amounts of the battery 19 consumed, it can be determined not to use records related to screens that are likely to be used in one usage mode in the estimation process, so the load of the estimation process can be reduced. Furthermore, the screens which are likely to be used in one usage mode may have a low degree of attention paid, so it is also possible to ensure the accuracy of the estimation process.

The sixth mode of the feature information INFOF includes the Wi-Fi connection rate at the activation timepoint of the first screen. If a Wi-Fi connection rate at activation timepoints of a screen is low, it means that the screen was activated, even though the connection was unstable for use, so it can be said that the screen is important to the user. On the other hand, it can be said that as a Wi-Fi connection rate at activation timepoints of the screen is higher, the screen is less important to the user. For example, a screen for an update may not be activated unless a Wi-Fi connection has been established, because updating requires downloading a large amount of data. It can be said the screen for an update has a low degree of attention paid to it. Therefore, when the feature information INFOF includes the Wi-Fi connection rate at the activation timepoint of the first screen, it can be determined not to use records related to screens that are not important for the user in the estimation process, so the load of the estimation process can be reduced. Furthermore, the screens which are not important for the user have low degrees of attention paid to them, so it is also possible to ensure the accuracy of the estimation process.

The seventh mode of the feature information INFOF includes the total number of times that the information processing apparatus 1 was located at the POI at the activation timepoint of the first screen in the screen log LG. If the number of times the user is located at the POI is high, it indicates that the screen is used at various locations the user is interested in. When the screen is used at various locations the user is interested in, it can be said the screen is important for the user. For example, screens activated at the POI 1, POI 2, POI 3, and POI 4 shown in FIG. 10 mean that the screens were used at home, at a workplace, and during commuting, and it can be said that the screens are important for the user. On the other hand, it can be said that a screen is less important to the user as the number of times the user is located at the POI at an activation timepoint of the screen is less. Therefore, when the feature information INFOF includes the total number of times that the information processing apparatus 1 was located at the POI at activation timepoints of the screen in the screen log LG, it can be determined not to use records related to screens that are not important for the user in the estimation process, so the load of the estimation process can be reduced. Furthermore, the screens which are not important to the user have low degrees of attention paid to them, so it is also possible to ensure the accuracy of the estimation process.

The eighth mode of the feature information INFOF is a combination of two or more modes of the first to the seventh modes. By combining two or more modes from among the first to the seventh modes, index values obtained from various viewpoints can be generated.

2. Modifications

The present invention is not limited to each of the embodiments exemplified above. Specific modification modes will be exemplified below. Two or more modes freely selected from the following modes may be combined.

(1) In the modes described above, the Table 400 shown in FIG. 4 shows a list of information that can be included in the feature information INFOF. However, information that can be included in the feature information INFOF is not limited to the information shown in the Table 400.

(1-1) For example, the feature information INFOF may include, for the first screen, an average value of a plurality of communication speeds at a plurality of screen activation timepoints or a variance value of the communication speeds at the screen activation timepoints. The communication speed may be an uplink communication speed, may be a downlink communication speed, or may be an average value of the uplink communication speed and the downlink communication speed. If the average value of the communication speeds at activation timepoints of the screen is small, it indicates that the degree of attention is high. If the variance value of the communication speeds at activation timepoints of the screen is large, it indicates that the degree of attention is high. In the first modification, the screen log LG includes speed information INFOS indicative of the communication speeds at respective different timepoints between the information processing apparatus 1 and the external apparatus.

FIG. 13 is a diagram showing an example of storage contents of the speed information INFOS. The speed information INFOS shown in FIG. 13 indicates that communication speeds were 2 Mbps, 384 Kbps, and 42 Mbps at 18:30:00, 19:00:00, and 19:30:00 as each of the plurality of timepoints, respectively.

When a time corresponding to the activation timepoint of the first screen does not exist in the speed information INFOS, the feature information generator 124 identifies the communication speed at an activation timepoint of the screen by using, for example, linear interpolation, in the same manner as the amount in the battery 19 remaining at an activation timepoint of the screen described above.

If the average value of the communication speeds at the plurality of activation timepoints is low, it means that a screen was activated even though the communication speed was not good enough for use, so it can be said that the screen is important for the user. It is similar to the Wi-Fi connection rate at activation timepoints of the screen.

If the variance value of the communication speeds at the plurality of screen activation timepoints is large, the screen is used in various situations, so it can be said that the screen is important for the user. On the other hand, as the variance value of the communication speeds at the activation timepoints is smaller, it can be said the screen is less important for the user. For example, as described above, the screen for an update may not be activated unless a Wi-Fi connection has been established because the updating requires downloading a large amount of data. It can therefore be said that the communication speed when Wi-Fi connection is being established has a smaller variance value as compared with when a Wi-Fi connection has not been established.

Therefore, when the feature information INFOF includes the average value or variance value of communication speeds at activation timepoints of the screen, it can be determined not to use records related to screens that are not important for the user in the estimation process, so the load of the estimation process can be reduced. Furthermore, the screens which are not important for the user have low degrees of attention paid to them, so it is possible to ensure the accuracy of the estimation process.

Comparing Wi-Fi connection rates with communication speeds, whether the user is connected to Wi-Fi is one of the important concerns of the user, and a commonly used OS displays an icon indicative of whether the user is currently connected to Wi-Fi on the display apparatus 16. Therefore, when the Wi-Fi connection rate is included in the feature information INFOF, the information processing apparatus 1 may generate connection period information INFOW according to displayed contents of the icon described above, which can be easily implemented. The Wi-Fi connection rate has an advantage in that the information processing apparatus 1 does not need to measure the communication speed.

On the other hand, when the average value or variance value of communication speeds is included in the feature information INFOF, high speed communication when an upper limit of a contracted data communication amount is not exceeded, and low speed communication when the upper limit of the contracted data communication amount is exceeded can be considered.

The communication speed at an activation timepoint of the screen is an example of "communication speed when the foreground screen transitioned to the first screen." The variance value of communication speeds is an example of "dispersion of communication speeds."

(1-2) Information that can be included in the feature information INFOF may include a foreground rate at the activation timepoint of the first screen. It is assumed that there is a screen that is activated in the foreground and that there is a screen that is activated in the background. A foreground rate at the first screen activation timepoint can be calculated by the following formula (5).

Foreground rate at an activation timepoint of the first screen=the total number of times that a screen in the foreground transitioned to the first screen when the first screen was activated in the screen log $LG$/the total number of times the first screen was activated in the screen log $LG$     (5)

In the modification, the screen log LG includes time information INFOT indicative of a timepoint when the screen was activated.

FIG. 14 shows an example of storage contents of the time information INFOT. FIG. 14 shows time information INFOT_1 to time information INFOT_3. The time information INFOT_1 indicates that a timepoint when the A-main screen was activated is 18:46:43. The time information INFOT_2 indicates that a timepoint when the A-login screen was activated is 18:46:44. The time information INFOT_3 indicates that a timepoint when the C-update screen was activated is 02:00:00.

As the foreground rate at the activation timepoint of the first screen is higher, the degree of attention tends to be higher. When a screen in the foreground when the first screen was activated transitions to the first screen, the user can easily and view the contents of the first screen. On the other hand, when a screen in the foreground when the first screen was activated does not transition to the first screen, i.e., when the first screen is activated in the background, it is difficult for the user to view the contents of the first screen obstructed by the foreground. As such, when the feature information INFOF includes the foreground rate at an activation timepoint of the screen, it can be determined not to use, in the estimation process, records related to screens, the contents of which are likely to be difficult for the user to view, so the load of the estimation process can be reduced. Furthermore, the screens, the contents of which are likely to be difficult for the user to view, have a low degree of attention paid to them, so it is also possible to ensure accuracy of the estimation process.

(3) In each form described above, a dispersion is described as, for example, a variance value or a difference between a maximum value and a minimum value, but this is not limited thereto. For example, the dispersion may be a standard deviation or a difference between first and third quartiles. The first quartile is a value at a position of 25% from the smallest value when a plurality of values are disposed. The third quartile is a value at a position of 75% from the smallest value when a plurality of values are disposed.

(4) In each mode described above, the "information representative of a ratio of the total number of times that the display apparatus was lit when the foreground screen transitioned to the first screen in the log to the total number of times the foreground screen transitioned to the first screen in the log" is described as, for example, the display apparatus lighted rate at an activation timepoint of the screen, but this is not limited thereto. For example, the information representative of the ratio may be an inverse number of the display apparatus lighted rate at an activation timepoint of the screen. The same applies to the Wi-Fi connection rate at an activation timepoint of the screen.

(5) In each mode described above, the information processing apparatus 1 generates the location information INFOP based on the location of the information processing apparatus 1 identified by the GPS apparatus 15, but this is not limited thereto. The location information INFOP may be generated by any method. For example, the information processing apparatus 1 may generate the location information INFOP by using a cell ID assigned to a base station being a destination of communication. Alternatively, when the information processing apparatus 1 communicates with the wireless LAN access point, the information processing apparatus 1 may generate the location information INFOP by referring to a database in which an identification address (MAC (Media Access Control) address) on the network assigned to the access point and an actual address are associated with each other.

(6) The block diagram used in the description of the forms described above shows blocks of functional units. The functional blocks (components) are implemented by a freely selected combination of hardware and/or software. Means for implementing each functional block is not particularly limited. That is, each functional block may be implemented by one apparatus that is physically and/or logically coupled, or may be implemented by a plurality of apparatuses by directly and/or indirectly (for example, via cable and/or radio) connecting the two or more apparatuses separated physically and/or logically.

(7) In each form described above, the notification of information is not limited to the modes/embodiment described herein and may be performed by other methods. For example, the notification of information may be performed by physical layer signaling (for example, DCI (Downlink Control Information), UCI (Uplink Control Information), upper layer signaling (for example, RRC (Radio Resource Control) signaling, MAC (Medium Access Control) signaling, notification information (MIB (Master Information Block), and SIB (System Information Block))), other signals, or combination thereof. The RRC signaling may be referred to as an RRC message, and may be, for example, an RRC connection setup message, and an RRC connection reconfiguration message.

(8) The order of the process procedure, sequence, flowchart, or the like in each form described above may be changed as long as there is no conflict. For example, in the method described herein, the various elements of the steps are presented in an exemplary order, but they are not limited to the specific presented order.

(9) In each form described above, the specific operation described as performed by the base station (for example, the location information is identified by the base station) may be performed by its upper node in some cases. In a network including one or more network nodes including a base station, it is obvious that various operations performed for communication with a terminal can be performed by the base station and/or another network node (for example, an MME or an S-GW is conceivable, but it is not limited to these) other than the base station. In the above, the case in which the number of other network nodes, other than the base station, is one is exemplified, but a combination of a plurality of other network nodes (for example, the MME and the S-GW) may be used.

(10) In each form described above, information or the like can be output from an upper layer (or a lower layer) to the lower layer (or the upper layer). It may be input and output via a plurality of network nodes.

(11) In each form described above, input or output information or the like may be saved in a specific place (for example, a memory) or may be managed with a management table. Input or output information or the like can be rewritten, updated, or added. Output information or the like may be deleted. Input information or the like may be transmitted to another apparatus.

(12) In each form described above, the determination may be made based on a value represented by one bit (0 or 1), or may be made based on a true-false value (Boolean: true or false), or may be made by comparing numerical values (for example, comparison with a predetermined value).

(13) In each form described above, although the portable information processing apparatus, such as a mobile phone or a smartphone, is exemplified as the information processing apparatus 1, the specific form of the information processing apparatus 1 may be freely selected and is not limited to the examples of the above-described forms. For example, a laptop or desktop computer may be used as the information processing apparatus 1.

(14) In each form described above, the storage apparatus 14 is the recording medium that can be read by the processing apparatus 12, and the ROM, RAM, and the like are exemplified, but it may be a flexible disk, a magneto-optical disk (for example, a compact disk, a digital versatile disk, or a Blu-ray® disk), a smart card, a flash memory device (for example, card, stick, or key drive), a CD-ROM (Compact Disc-ROM), a register, a removable disk, a hard disk, a Floppy® disk, a magnetic strip, a database, a server, or any other appropriate storage medium. The program may be transmitted from the network. Alternatively, the program may be transmitted from a communication network via a telecommunication line.

(15) Each form described above may be applied to a system using LTE (Long Term Evolution), LTE-A (LTE-Advanced), SUPER 3G, IMT-Advanced, 4G, 5G, FRA (Future Radio Access), W-CDMA®, GSM®, CDMA 2000, UMB (Ultra Mobile Broadband), IEEE 802.11 (Wi-Fi), IEEE 802.16 (WiMAX), IEEE 802.20, UWB (Ultra-Wide-Band), Bluetooth®, or any other appropriate system, and/or a next generation system extended based on these.

(16) In each form described above, the described information, signals, and the like may be represented by using any of various different technologies. For example, the data, instructions, commands, information, signals, bits, symbols, chips, and the like that can be referred to throughout the above description may be represented by voltages, currents, electromagnetic waves, magnetic fields or magnetic particles, optical fields or photons, or a freely selected combination thereof. It is to be noted that the terms in the present specification and/or terms necessary for understanding the present specification may be replaced with terms having the same or similar meanings.

(17) Each function exemplified in FIG. 1 is implemented by a freely selected combination of hardware and software. Each function may be implemented by a single apparatus or may be implemented by two or more apparatuses that are formed separately from each other. For example, a processing apparatus of the server apparatus connected with the information processing apparatus 1 may function as the screen log acquirer 122, feature information generator 124, index value generator 126, determiner 128, and estimator 129. Alternatively, the processing apparatus 12 may function as the screen log acquirer 122, feature information generator 124, index value generator 126, and determiner 128, and transmit only records determined to be used in the estimation process of the screen log LG to the server apparatus, and the processing apparatus of the server apparatus may function as the estimator 129.

(18) The program exemplified in each embodiment described above should be broadly construed to mean instructions, instruction sets, codes, code segments, program codes, subprograms, software modules, applications, software applications, software packages, routines, subroutines, objects, executable files, execution threads, procedures, functions, or the like, regardless of whether it is called software, firmware, middleware, microcode, or hardware description language, or called by any other name. The software, instructions, and the like may be transmitted or received via a transmission medium. For example, when the software is transmitted from a website, a server, or another remote source by using a wired technology such as coaxial cable, optical fiber cable, twisted pair cable, and digital subscriber line (DSL) and/or a wireless technology such as infrared, radio, and microwave, the wired technology and/or wireless technology is included in the definition of the transmission medium.

(19) In each embodiment described above, the terms "system" and "network" are used interchangeably.

(20) In each embodiment described above, the information, parameters, and the like may be represented by absolute values, may be represented by relative values from a predetermined value, or may be represented by corresponding different information. For example, radio resources may be ones that are indicated by indexes.

(21) The names used for the above parameters are not limiting in any way. Furthermore, the formulas and the like that use these parameters may differ from those explicitly disclosed herein. Various channels (for example, PUCCH and PDCCH) and information elements (for example, TPC) can be identified by any suitable names, so the various names assigned to the various channels and information elements are not limiting in any way.

(22) In each embodiment described above, the base station can accommodate one or more (for example, three) cells (also called sectors). When the base station accommodates a plurality of cells, the whole coverage area of the base station can be divided into a plurality of smaller areas, and each of the smaller areas can be provided with communication services by a base station subsystem (for example, indoor small base station RRH: Remote Radio Head). The term "cell" or "sector" refers to part or all of the coverage area of the base station and/or base station subsystem that provides communication services in the coverage. The terms "base station," "eNB," "cell," and "sector" can be used interchangeably herein. The base station may be referred to using terms such as fixed station, NodeB, eNodeB (eNB), access point, femtocell, and small cell.

(23) In each embodiment described above, a case in which the information processing apparatus 1 is a mobile station is included. The mobile station may be referred to, by those skilled in the art, as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or other appropriate term.

(24) In each embodiment described above, the term "connected" or any modification thereof means any direct or indirect connection or coupling between two or more elements, and can include the presence of one or more intermediate elements between two elements that are "connected" to each other. The connection between the elements may be physical, logical, or a combination thereof. As used herein, it can be considered that the two elements are "connected" to each other, by using one or more wires, cables and/or printed electrical connections, and as some non-limiting and non-exclusive examples, by using electromagnetic energy such as electromagnetic energy having wavelengths in a radio frequency region, a microwave region, and a light (both visible and invisible) region.

(25) In each embodiment described above, the description "based on" does not mean "based only on" unless specified otherwise. In other words, the description "based on" means both "based only on" and "based at least on."

(26) Any reference to elements using designations such as "first" and "second" used herein does not generally limit amounts or orders of the elements. These designations can be used herein as a convenient method to distinguish between two or more elements. Therefore, the reference to first and second elements does not mean that only two elements can be adopted there or that the first element must precede the second element in some way.

(27) In each embodiment described above, as long as "including," "comprising," and modifications thereof are used in the present specification or claims, the terms are intended to be inclusive in the same manner as the term "comprising." Furthermore, the term "or" used in the present specification or claims is not intended to be an exclusive OR.

(28) Throughout the present application, when articles are added by translation like, for example, "a," "an," and "the" in English, these articles include the plural unless the context clearly indicates otherwise.

(29) It will be apparent to those skilled in the art that the present invention is not limited to the embodiment described herein. The present invention can be implemented with modified and changed modes without departing from the sprit and scope of the present invention as claimed in the claims. Therefore, the description of the present specification is for the purpose of exemplification, and does not have any restrictive meaning for the present invention. A plurality of modes selected from the modes exemplified herein may be combined.

DESCRIPTION OF REFERENCE SIGNS

1 Information processing apparatus
12 Processing apparatus
122 Screen log acquirer
124 Feature information generator
126 Index value generator
128 Determiner
129 Estimator
INFOB1 Remaining battery information
INFOB2 Battery consumption information
INFOF Feature information
INFOL Lighted period information
INFOP Location information
INFOS Speed information
INFOT Time information
INFOW Connection period information
LG Screen log

The invention claimed is:

1. An information processing apparatus comprising:
a feature information generator configured to generate feature information on transition to a first screen based on a log including a transition timepoint and identification information, the transition timepoint being a timepoint when a foreground screen transitioned from a second screen to the first screen, with the first and second screens being among a plurality of screens displayed by a plurality of program modules different from each other, and the identification information identifying, from among the plurality of program modules, a first program module for displaying the first screen;
an index value generator configured to generate based on the feature information an index value indicative of a degree to which the first screen draws attention from a user; and
a determiner configured to determine based on the index value whether to use the identification information in a process of estimating a state of the user.

2. The information processing apparatus according to claim 1, wherein
the feature information includes at least one of:
a total number of times the foreground screen transitioned to the first screen in the log;
an average value of number of times the foreground screen transitioned to the first screen over a plurality of unit periods;
a dispersion of a number of times over a plurality of unit periods;
an average value of lengths of a plurality of activated periods until the foreground screen transitioned to a third screen from a point when the foreground screen transitioned to the first screen; and
a dispersion of the lengths of the plurality of activated periods.

3. The information processing apparatus according to claim 1,
wherein the feature information includes a number of types of the second screen before the foreground screen transitioned to the first screen, or a number of types of a third screen to which the foreground screen transitioned from the first screen.

4. The information processing apparatus according to claim 1, wherein:
the log includes lighted period information indicative of a period during which a display apparatus for displaying the plurality of screens was lit, and
the feature information includes information representative of a ratio of a total number of times the display apparatus was lit when the foreground screen transitioned to the first screen in the log, to a total number of times the foreground screen transitioned to the first screen in the log.

5. The information processing apparatus according to claim 1, wherein:
the log includes time information indicative of a timepoint when the first screen was activated, and
the feature information includes information representative of a ratio of a total number of times the foreground screen transitioned to the first screen when the first screen was activated in the log, to the total number of times the first screen was activated in the log.

6. The information processing apparatus according to claim 1, wherein:
the log includes remaining battery information indicative of amounts of a battery remaining at respective timepoints, and
the feature information includes an average value of the remaining amounts at a plurality of timepoints when the foreground screen transitioned to the first screen, or a dispersion of the remaining amounts.

7. The information processing apparatus according to claim 1, wherein:
the log includes battery consumption information indicative of amounts of a battery consumed in respective unit periods, and
the feature information includes an average value of a plurality of amounts of the battery consumed over a plurality of activated periods until the foreground screen transitioned to a third screen from a point when the foreground screen transitioned to the first screen, or a dispersion of the plurality of amounts of the battery consumed over the plurality of activated periods.

8. The information processing apparatus according to claim 1, wherein:
the log includes connection period information indicative of a period during which a connection between the information processing apparatus for displaying the plurality of screens and a wireless LAN access point was established, and
the feature information includes information representative of a ratio of a total number of times the connection was established when the foreground screen transitioned to the first screen in the log, to a total number of times the foreground screen transitioned to the first screen in the log.

9. The information processing apparatus according to claim 1, wherein:
the log includes speed information indicative of communication speeds at respective timepoints between the information processing apparatus for displaying the plurality of screens and an external apparatus of the information processing apparatus, and
the feature information includes an average value of the communication speeds at a plurality of timepoints when the foreground screen transitioned to the first screen, or a dispersion of the communication speeds at the plurality of timepoints.

10. The information processing apparatus according to claim 1, wherein:
the log includes location information indicative of a location of the information processing apparatus for displaying the plurality of screens at respective timepoints, and
the feature information includes a total number of times the location information indicates a predetermined location at a timepoint when the foreground screen transitioned to the first screen in the log.

11. The information processing apparatus according to claim 2,
wherein the feature information includes a number of types of the second screen before the foreground screen transitioned to the first screen, or a number of types of a third screen to which the foreground screen transitioned from the first screen.

* * * * *